Patented Dec. 14, 1943

2,336,941

UNITED STATES PATENT OFFICE 2,336,941

REDUCTION PRODUCT OF ARYL DINITROSO COMPOUNDS

Elbert C. Ladd, Passaic, and William P. ter Horst, Packanack Lake, N. J., assignors to United States Rubber Company, New York, N. Y., a corporation of New Jersey No Drawing. Application August 29, 1941, Serial No. 408,756

17 Claims. (Cl. 260—307)

This invention relates to methods of reducing aryl dinitroso compounds and to the reduced compounds.

This case is a continuation-in-part of our application Serial No. 327,630, filed April 3, 1940.

The invention broadly comprises an improved method of reducing aryl dinitroso compounds, and particularly those of the class consisting of quinone dioxime peroxides, and aryl oxdiazole oxides such as aryl furazan oxides and aryl iso-oxdiazole oxides—by means of an alkaline sulfide such as the alkali-metal sulfides and the alkali earth metal sulfides. By alkali-metal herein is meant alkali-metals such as sodium and potassium, etc., as well as the hypothetical alkali-metal, ammonium. Examples of this class of reducing agent are sodium sulfide, sodium hydrosulfide, ammonium sulfide, ammonium polysulfide, calcium hydrosulfide, etc. It has been found that when reducing agents of this type react upon aryl dinitroso bodies, reaction products or reaction mixtures are formed which are useful as such. From such mixtures the desired components may be separated by proper treatment, for example, quinone dioximes such as benzo-quinone dioximes, and aryl furazanes such as benzofurazan.

By the present method, elevated temperatures are not required since the reduction takes place rapidly at room temperature. Also expensive solvents are not required. The reducing agents are relatively inexpensive and the yields of desired products are good and the formation of by-products is minimized.

The reducing agent may be added to an aqueous suspension of the dinitroso compound in water or the reducing agent may be formed in situ by passing hydrogen sulfide into an alkaline or ammoniacal suspension or solution of the dinitroso compound.

After the reduction the reaction mixture may be worked up by one of several methods depending upon the type of product desired. This is illustrated by the following examples:

Example 1

136 grams (1 mol) of ortho-benzoquinone dioxime peroxide (probably

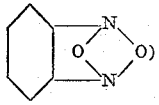

are suspended in 700 cc. of water and 56 grams (1 mol.) of NaSH or 80 grams of sodium sulfhydrate (70% NaSH) are gradually added, with good stirring. During the addition the temperature is maintained in the neighborhood of 25-35° C. by suitably cooling. After the addition is complete, stirring may be continued for a time to insure completeness of the reaction. The reaction mixture is then neutralized with or made slightly acid with a suitable acid, such as sulfuric, and the precipitate which forms is filtered off, washed with water and dried.

The product is a yellow solid which has a melting range of approximately 125-135° C. A typical analysis is sulfur, 17.6%; nitrogen, 16.3%. The product is partially soluble in bases, e. g., dilute ammonia water, giving a red solution. This solution when filtered and acidified yields a yellow precipitate which is practically free of sulfur, melts at 140-145° C. and analyzes approximately 20.2% nitrogen. This product is 1,2-benzoquinone dioxime

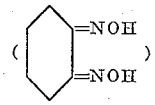

That portion which is insoluble in the alkali burns with the blue flame characteristic of sulfur, and gives off SO$_2$ fumes when burned. Its melting range is approximately 112-120° C. This alkali insoluble portion accordingly is believed to be largely free sulfur, together with small amounts of other unidentified products.

The reaction product is suitable for use in fungicidal and insecticidal preparations.

Example 2

In this example the procedure of Example 1 is followed up to the point where the sodium sulfhydrate addition has been completed and the mixture stirred for an adequate time. The reaction mixture is then filtered, the residue washed with water and the water washings added to the main filtrate. The filtrate is then neutralized or made just acid with a suitable acid such as sulfuric. The yellow precipitate which forms is filtered off, washed with water and suitably dried. The product so obtained has a melting point of about 140-145° C., is completely soluble in dilute ammonia water to give a deep red solution. It analyzes 20.2% nitrogen, and is practically free of sulfur, and consists essentially of pure 1,2-benzoquinone dioxime.

Example 3

In this example the procedure of Example 1 is followed up to the point where the addition of the sodium sulfhydrate has been completed, and the mixture adequately stirred. The dioxime in the reaction mixture is then converted into the corresponding furazan by subjecting the mixture to steam distillation. A white solid forms in the distillate. The distillation is continued until no more solid distillate is formed. The product is then filtered off, washed with water and dried. The product is white, has a melting point of 50–52° C., and is soluble in many organic solvents, including alcohol, acetone, benzene, kerosene, etc. The product readily sublimes at room temperature, and corresponds to benzo-furazan (probably

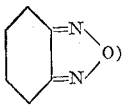

*Example 4*

467 parts by weight of 4-chloro-1,2- benzoquinone dioxime peroxide (4-chlor-1,2-dinitrosobenzene) (probably

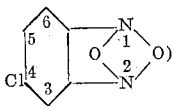

are suspended in 2 liters of water, and 220 parts of sodium sulfhydrate (70% NaSH) are added gradually with good stirring. To insure maximum yield it is desirable to prevent the temperature from rising materially above room temperature by suitable cooling during the addition, and preferably the reaction temperature is somewhat lower than room temperature (for example 10–15° C.). After the addition has been completed, the reaction mixture may be stirred for a time to insure completeness of the reaction. The reaction mixture is neutralized or made just acid with a suitable acid such as sulfuric, whereupon a yellowish brown precipitate forms. The precipitate is filtered off, washed with water and dried. The product has the following characteristics: Melting range of about 95–105° C. Typical analysis: 16.3% chlorine, 17.5% sulfur. The product is partially soluble in dilute ammonia water, the solution being deep red in color. Neutralization of the filtered solution precipitates a yellowish brown solid which is practically free from sulfur, and which has a melting point of 110–115° C. This portion of the product consists essentially of 4-chloro-1,2-benzoquinone dioxime

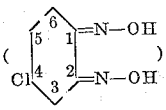

The ammonia insoluble portion appears to be largely sulfur, since it burned with a blue flame and gave off SO₂ when burned.

The reaction product may be used in insecticidal and fugicidal preparations.

*Example 5*

The procedure of Example 4 is followed up to the point where the sodium sulfhydrate has been added and the mixture sufficiently stirred. The reaction mixture is then filtered, the residue washed with water and the combined filtrates neutralized or just made acid with a suitable acid such as sulfuric acid, and the yellowish brown precipitate which is formed is filtered off, washed with water and dried. The product has a melting point of 110–115° C. The nitrogen found is 15.9%. The product is essentially free of sulfur, and consists of 4-chloro-1,2-benzoquinone dioxime.

*Example 6*

The procedure of Example 4 is followed up to the place where the sodium sulfhydrate has been added, and the reaction mixture adequately stirred. The dioxime in the reaction mixture is then converted into the corresponding furazan by the action of heat. Conveniently this may be done by steam distilling the mixture until a white solid no longer comes over in the distillate. The solid is then filtered, washed with water and dried. The product has a melting point of 38–41° C. and is soluble in many organic solvents including alcohol, acetone, benzene, kerosene, etc. The product is 4-chloro-benzofurazan

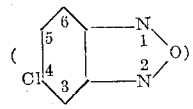

In other modifications of the invention for the preparation of an aryl dioxime, the dinitroso compound (1 mol) may be suspended in water containing the calculated amount of a basic material such as ammonia or sodium hydroxide and the calculated amount (1 mol) of hydrogen sulfide passed into the suspension with stirring and suitable cooling. The product is worked up as described above. Also, in place of water or partially in place of water a solvent such as ordinary alcohol may be used for the reaction medium.

The process is of general application for the preparation of that class of compounds described above as well as their analogs or homologs. For example, the process may be applied to the preparation of naphthoquinone dioximes and naphthofurazans from dinitroso-naphthalenes, to the preparation of p-benzoquinone dioxime from p-dinitrosobenzene, 4-bromo-1,2-benzoquinone dioxime and 4-bromobenzofurazan from 4-bromo-1,2-benzoquinone dioxime peroxide, 4-methyl-1,2-benzoquinone dioxime and 4-methylbenzofurazan from 4-methyl benziso-oxdiazole oxide, and the like.

Having thus described our invention, what we claim and desire to protect by Letters Patent is:

1. A method which comprises reacting one mol weight of an aromatic dinitroso compound with approximately one mol-equivalent weight of an alkaline sulfide whereby a mixture comprising a quinone dioxime and free sulphur is formed.

2. A method which comprises reacting one mol weight of a quinone dioxime peroxide with approximately one mol-equivalent weight of an alkaline sulfide, whereby a mixture comprising a quinone dioxime and free sulfur is formed.

3. A method which comprises reacting one mol weight of an ortho quinone dioxime peroxide with approximately one mol-equivalent weight of an alkaline sulfide, whereby a mixture comprising an ortho quinone dioxime and free sulfur is formed.

4. A method which comprises reacting one mol weight of a haloquinone dioxime peroxide with approximately one mol-equivalent weight of an alkali metal hydrosulfide, whereby a mixture comprising a haloquinone dioxime and free sulfur is formed.

5. A method which comprises reacting one mol weight of a 4-halo-1,2-benzoquinone dioxime peroxide with approximately one mol-equivalent weight of sodium hydrosulfide, whereby a mixture comprising a 4-halo-1,2-benzoquinone dioxime and free sulfur is formed.

6. A method which comprises reducing one mol weight of a quinone dioxime peroxide with approximately one mol-equivalent weight of an alkaline sulfide, to a quinone dioxime.

7. A method which comprises reducing one mol weight of a quinone dioxime peroxide with approximately one mol-equivalent weight of an alkaline sulfide, thereafter neutralizing the mixture, and recovering a quinone dioxime.

8. A method which comprises reducing a halo-1,2-benzoquinone dioxime peroxide with an alkali metal sulfide, thereafter neutralizing the mixture, and recovering a haloquinone dioxime.

9. A method which comprises reducing one mol weight of an ortho quinone dioxime peroxide with approximately one mol-equivalent weight of an alkaline sulfide, thereafter neutralizing the mixture, and recovering an ortho quinone dioxime.

10. A method which comprises reacting one mol weight of an ortho quinone dioxime peroxide with approximately one mol-equivalent weight of an alkali metal sulfide whereby a quinone dioxime is formed, and thereafter converting the dioxime to an aryl furazan by heat.

11. A method which comprises reducing one mol weight of an ortho quinone dioxime peroxide with approximately one mol-equivalent weight of an alkali metal sulfide, steam distilling the reaction mix, and recovering an aryl furazan from the distillate.

12. A method which comprises reducing one mol weight of a halo-ortho-quinone dioxime peroxide with approximately one mol-equivalent weight of an alkali metal sulfide, steam distilling the reaction mix, and recovering a halo-aryl furazan from the distillate.

13. A method which comprises reducing one mol weight of a para quinone dioxime peroxide with approximately one mol-equivalent weight of an alkaline sulfide, thereafter neutralizing the mixture, and recovering para quinone dioxime.

14. A method which comprises reducing one mol weight of an ortho quinone dioxime peroxide with approximately one mol-equivalent weight of an alkaline sulfide, steam distilling the reaction mix, and recovering an aryl furazan from the distillate.

15. A method which comprises reducing one mol weight of a halo-ortho-quinone dioxime peroxide with approximately one mol-equivalent weight of an alkaline sulfide, steam distilling the reaction mix, and recovering a halo-aryl furazan from the distillate.

16. A method which comprises reducing one mol weight of an ortho quinone dioxime peroxide with approximately one mol-equivalent weight of an alkaline sulfide, whereby an ortho quinone dioxime is formed.

17. A method which comprises reacting one mol weight of an ortho quinone dioxime peroxide with approximately one mol-equivalent weight of an alkaline sulfide whereby an ortho quinone dioxime is formed, and thereafter converting the dioxime to an aryl furazan by heat.

ELBERT C. LADD.
WILLIAM P. ter HORST.